United States Patent [19]

Carruth, Jr.

[11] 4,373,198
[45] Feb. 8, 1983

[54] UPDATING AND ALERTING METHOD AND APPARATUS ASSOCIATED WITH A MICROCOMPUTER SYSTEM FOR AUTOMATICALLY INDICATING AND RECORDING PARAMETERS THAT SPATIALLY DEFINE LOCATIONS OF SEISMIC EXPLORATION SPREAD AND SOURCE ARRAYS

[75] Inventor: H. T. Carruth, Jr., Anaheim, Calif.

[73] Assignee: Chevron Research Company, San Francisco, Calif.

[21] Appl. No.: 169,334

[22] Filed: Jul. 16, 1980

[51] Int. Cl.³ .................... G01V 1/20; G01V 1/28; G08C 25/00
[52] U.S. Cl. .................... 367/37; 364/200; 364/421; 367/60
[58] Field of Search ............. 367/14, 37, 55, 56, 367/60, 71, 63, 74; 346/33 C; 364/421, 900, 200

[56] References Cited

U.S. PATENT DOCUMENTS

| 4,214,128 | 7/1980 | Bovee et al. | 367/60 |
| 4,257,098 | 3/1981 | Lacy | 371/33 |
| 4,280,201 | 7/1981 | Mart | 367/56 |
| 4,285,052 | 8/1981 | Bobbitt | 367/56 |

Primary Examiner—Maynard R. Wilbur
Assistant Examiner—Kenneth Kaiser
Attorney, Agent, or Firm—H. D. Messner; Edward J. Keeling

[57] ABSTRACT

The present invention relates to a method and apparatus for selectively providing an alarm-generating digital code so as to alert an operator that the next-in-time positions of a source-detector array are the last approved locations before the recording truck location must be changed, i.e., "rolled forward" a predetermined distance along the line of survey and array parameters renormalized.

8 Claims, 8 Drawing Figures

FIG_3

FIG_4

FIG_7A

FIG_7B

FIG_7C

FIG_7D

FIG_8

UPDATING AND ALERTING METHOD AND APPARATUS ASSOCIATED WITH A MICROCOMPUTER SYSTEM FOR AUTOMATICALLY INDICATING AND RECORDING PARAMETERS THAT SPATIALLY DEFINE LOCATIONS OF SEISMIC EXPLORATION SPREAD AND SOURCE ARRAYS

FIELD OF THE INVENTION

This invention relates to an improved method and apparatus for providing control of field shooting and recording operations during exploration of hydrocarbons, or the like.

Related Applications

My following commonly assigned application is incorporated herein by reference:

Ser. No. 169,336 filed July 16, 1980 for "Ground Position Controller And Method For Automatically Indicating And Recording Parameters That Spatially Define Locations Of Seismic Exploration Spread And Source Arrays".

Also, there is an additional commonly assigned application in the area of seismic exploration of interest:

Ser. No. 169,345 filed July 16, 1980 for "Ground Position Controller And Method For Automatically Indicating Parameters That Spatially Cross-Reference The Locations Of Seismic Spread And Source Arrays During Exploration For Hydrocarbons And The Like".

BACKGROUND OF THE INVENTION

While the above-identified ground position controller and method of my related applications provides for automatic generating, formatting, displaying and recording of seismic information (including next-in-time sensor and source array geographic locations), additional operational problems remain.

E.g., as the source-detector array is being sequentially advanced along a line of survey, modifications must be made to the input parameters (of the ground position controller) during operations, especially where the array has advanced to its fullest extent, location-wise, vis-a-vis a fixed recording truck-roll switch start position associated with a key position of the "active" array of detectors along the line of survey.

SUMMARY OF THE INVENTION

The present invention relates to a method and apparatus for selectively providing an alarm-generating digital code so as to alert an operator that the next-in-time positions of a source-detector array are the last approved locations before the recording truck location must be changed, i.e., "rolled forward" a predetermined distance along the line of survey and array parameters renormalized. The alarm-generating data are produced along with other conventional next-in-time array parameters as bits of digital data using a microcomputer system operationally connected to a digital field system (DFS) within the recording truck through a system bus. The data of interest are provided only, however, on the occurrence of a situation in which the number of source-detector positions to be "rolled forward" is equal to or greater than a maximum approved group number stored within the microcomputer system. Audio and/or visual alarms are then triggered.

DESCRIPTION OF THE DRAWINGS

These and other functions of the present invention will become evident to those skilled in the art from a reading of detailed descriptions embodiments thereof, following a brief description of the appended drawings.

DESCRIPTION OF PREFERRED EMBODIMENTS OF THE INVENTION

Figure 1:
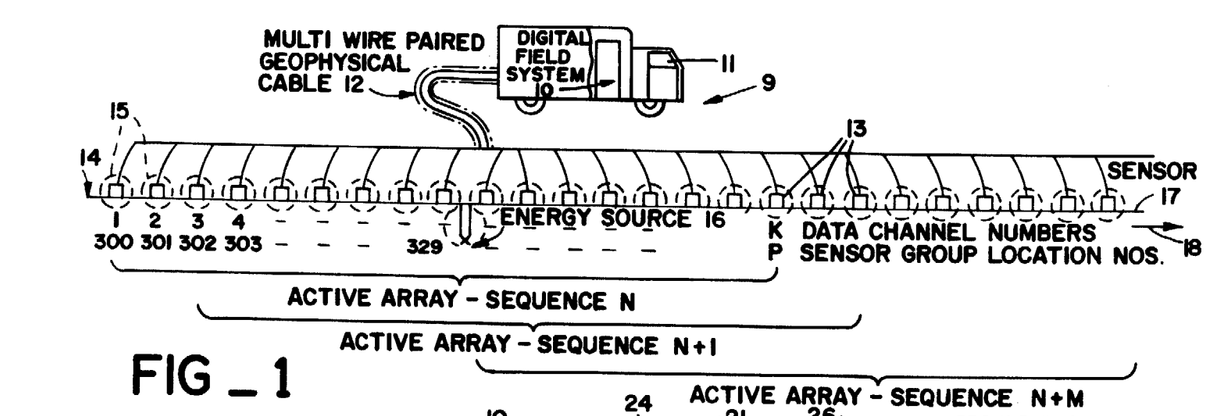
FIGS. 1 and 2 illustrate an exploration system incorporating the present invention in which a source of energy and an array of sensors connected to a recording truck, are illustrated.

FIG. 1 illustrates operation of seismic exploration system 9 of the present invention.

As shown, system 9 includes digital field system (DFS) 10, housed within recording truck 11 and electrically interconnected via a multiwire geophysical cable 12 to an array of sensors 13 positioned at the earth's surface 14. Ground locations 15 are represented as surrounding both the array of sensors 13 and seismic energy source 16, all positioned along the surface 14. As previously mentioned in the CDPR collection process, the ground locations 15 would, more likely than not, have been previously surveyed prior to implementation of the seismic surveying operation along the line of survey 17 in the direction of arrow 18. Hence, each of the locations 15 can be designated by a particular position number (or P number) along the line 17. The P numbers set forth in FIG. 1 include the numbers 300, 301 . . . 329. Also, the number of sensors 13 forming each array (as the data is collected) is identified by the sequence numbers N, N+1 . . . N+M designating the length of the active array as the sensors 13 are advanced in the direction of arrow 18.

Annotating the positions of the sensor arrays is aided by the fact that each sensor is associated with a particular data channel 1, 2 . . . K of the DFS 10 as the data is collected. For usual operations K can be 24, 48, 60, 96, 120, etc., as required, although, of course, the present invention is not limited to a particular channel capacity number, but can be varied to accommodate any field arrangement. Each sensor position and each source location can be indicated using the ground position controller 20 of the present invention in conjunction with recording unit 21 of the DFS 10.

Figure 2:
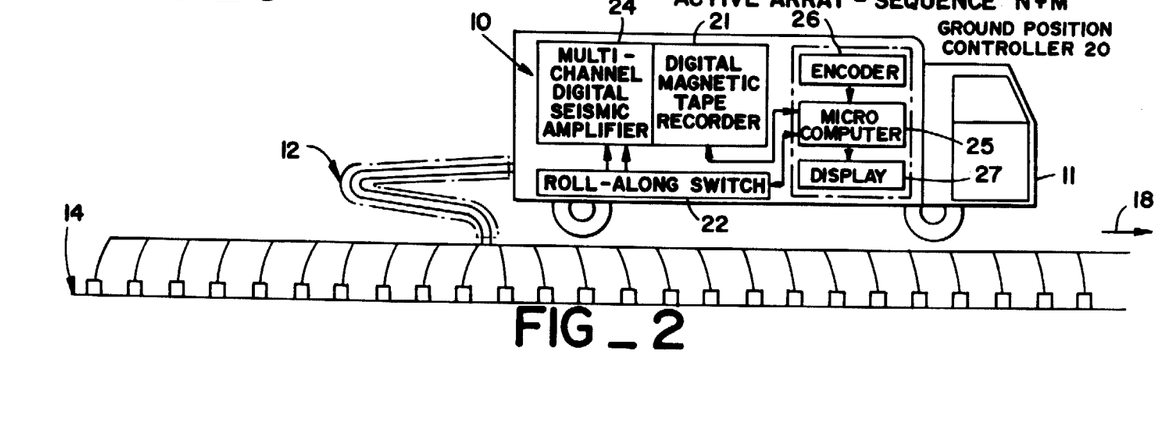

FIG. 2 illustrates ground position controller 20 in more detail.

Briefly, the ground position recorder 20 operates in the field to insure integrity between prescribed and actual field shooting and recording operations by a series of steps, namely, storing, manipulating and displaying data related (i) to field positions of the source and sensor array by position number, (ii) to array and source geometrical locations (both present and next-in-time) based on field geometrical algorithms and (iii) to recording array and source parameters so that realistic annotation of the subsequently collected seismic data can be made. For these purposes, the operator utilizes encoded data provided initially by him using encoders 26, manipulated results generated by the controller 20 based on part in stored relationships within the microcomputer 25, and finally indicating geometrical data set forth at displays 27 and as header information at recording unit 21.

Since the present invention deals conveniently with the CDPR process, the array of sensors 13 and source of energy 16 are continually "rolled forward" in the direction of arrow 18 using rollalong switch 22. That is to say, after the seismic data has been recorded at the digital tape recording unit 21 (after amplification by amplifier 24), the array of sensors 13 (and source 16) located at a first series of positions P as shown, are "rolled forward" in the direction of arrow 18. Note that the changing of the active array pattern of FIG. 1 in the aforementioned manner is identified by the array sequence designated N, N+1 ... N+M, as previously mentioned. But, the array and source geometry is always known at the recording truck 11 provided the 20 positional locations 300, 301, 302 ... P of FIG. 1 for the particular active array N, N+1 ... N+M are correctly identified and recorded during each recording cycle, via operation of the ground position controller 20 of the present invention; of particular importance is the manipulation of data associated with the field geometry of the sensors 13 and source 16 via geometrical and performance algorithms stored within microcomputer 25 of the controller 20.

As previously mentioned, microcomputer 25 is used to predict correct array positions as the rollalong switch 22 switches between "active" and "inactive" arrays of sensors. The microcomputer 25 can also interact with the rollalong switch 22, provided the latter is capable of accepting the multi-bit codes conventionally generated by the microcomputer 25. (In this regard, an approved rollalong switch is manufactured under the tradename "Rolalong Switch", by Input-Output, Inc., Houston, Texas, and consists of a series of contacts attached to a central shaft of a stepping motor controlled via a digital input code from the microcomputer 25.)

Rollalong switch 22 usually includes a display (not shown) associated with one or two of the locational positions of the active array of sensors 13. Such display, of course, changes as the active array changes sequential pattern in the manner of N, N+2 ... N+M, as shown in FIG. 1. The rollalong switch 22 also includes a digital generator (not shown) for generating a second multi-bit code indicative of the position P of a member of the sensor array as header indicia at the recorder 21. However, as previously mentioned, the latter digital code represents only an arbitrary number and is not a true geodytic location.

Figure 3:
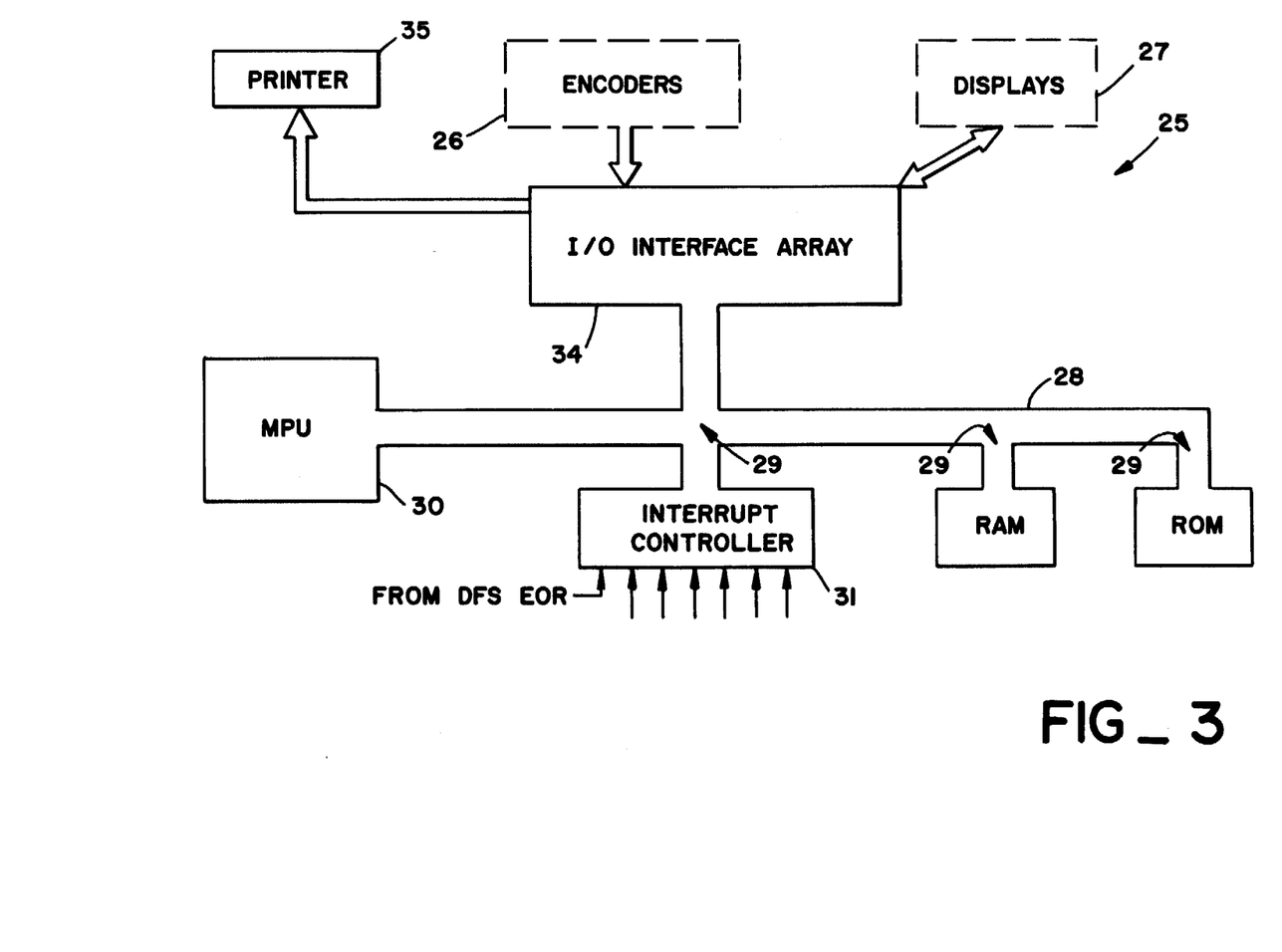
FIGS. 3, 4, 5 and 6 are diagrams of certain aspects of a microcomputer system and controller of the present invention used within the exploration system of FIGS. 1 and 2.

FIG. 3 illustrates microcomputer 25 of controller 20 in still more detail.

As shown, the microcomputer 25 includes a system bus 28 used to connect encoders 26 and displays 27 via I/O interrupt array 34 to microprocessor unit 30 (MPU) of the microcomputer 25. Also connected via the bus 28 and ports 29 are interrupt controller 31, RAM 32, ROM 33 (in addition to I/O interfacing array 34) which operates in conventional fashion to calculate, manipulate, store and display position data associated with the exploration operation. Note that the I/O array 34 not only links the MPU 30 with the encoders 26 and displays 27, but it is also used to provide data to the printer 35 under control of MPU 30 to generate a permanent record of the displayed data at displays 27, if desired.

Bus 28 essentially comprises three separate buses, a data bus, an address bus and a control bus. The data bus is conventional: it not only carries information to and from MPU 30, but it is also used to fetch instructions that have been stored in ROM 33, as required, as well as carries data from/to the encoders 26 and displays 27 of FIG. 2, by way of (or independent of) RAM 32.

Addressing segments of the data is the annotations function of the address bus. It is capable of selecting a location in RAM 32 or ROM 33 or a particular address in the MPU 30 when appropriately signaled, say by interrupt controller 31. The control bus controls the sequencing and nature of the operation using common selector commands, e.g., "Read", "Write", etc.

Additionally, it should be noted, the system interrupts are usually carried via the control bus to implement the scheduling and servicing of different ports, as required by operations. In the present invention, interrupt controller 31 handles seven (7) vectored priority interrupts for the MPU 30, as explained below, including an end-of-record interrupt (EOR) generated by the digital field system 10, FIG. 1, to indicate the end of the collection cycle, and to initiate operations in the next-in-time cycle.

In general, in servicing the interrupts, preservation of program status is required and is easily carried by the MPU 30. Since the controller 31 is both vectored and priority oriented, it has the responsibility of providing vectored interrupts to the MPU 30, of identifying the nature of the interrupt, (or its branching address) and of establishing priority between competing interrupts. In particular in servicing the EOR interrupt, the steps set forth in FIGS. 9B and 9D are executed to bring about automatic updating of the array and source geometry to achieve the next-in-time collection of data, based in part on the field algorithms contained in equation sets I, II, III or IV set forth below.

Figure 4:
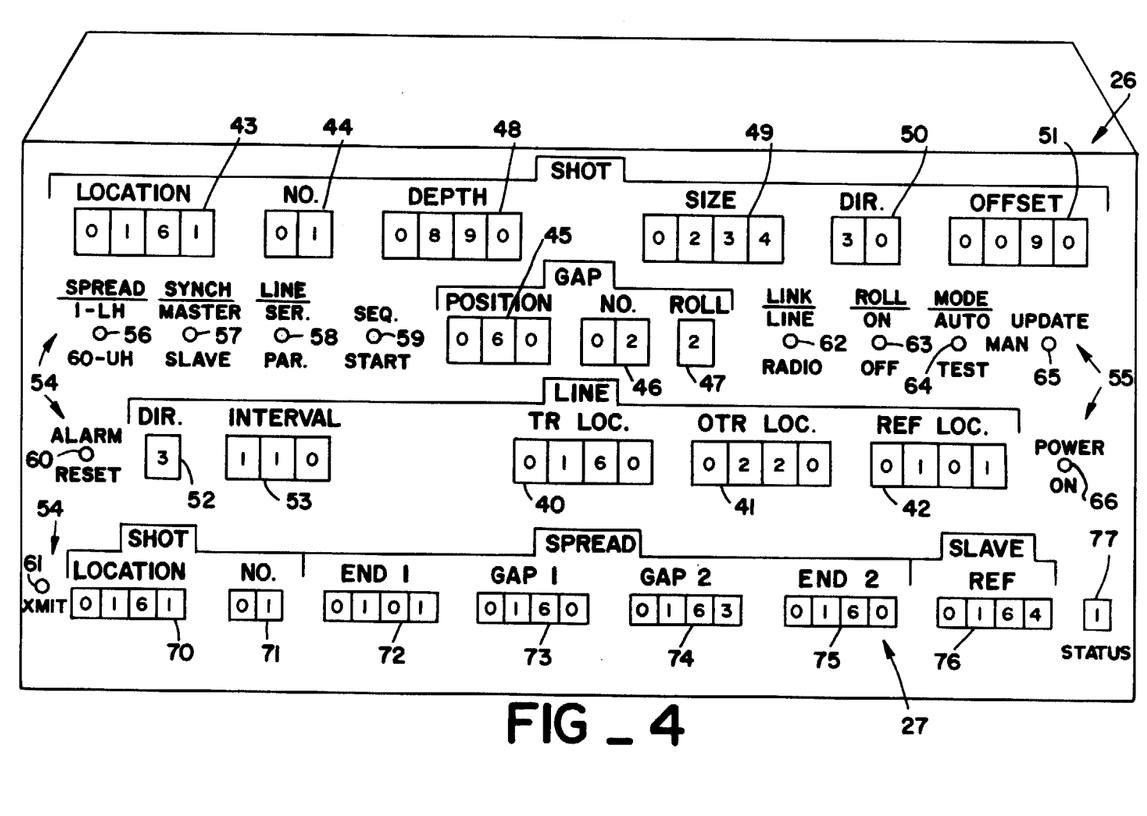

FIG. 4 illustrates the nature of the data provided at encoders 26 and displays 27.

The operator initially calibrates positions of the exploration array and source with previously surveyed geographical stations. Information has been already encoded via the encoders 26 for use by microcomputer 25 before operations begin. Encoded data at encoders 26 includes:

(i) truck location (vis-a-vis survey stations of known geographic location) encoded at encoder sub-element 40;

(ii) slave truck location (if applicable) encoded using encoder sub-element 41;

(iii) reference station location (where the end of the spread is initially positioned) encoded via encoding sub-element 42;

(iv) initial location of the energy source encoded using encoder sub-element 43;

(v) the number of shots or sweeps encoded at sub-element 44;

(vi) the initial gap position, stored at sub-element 45;

(vii) the gap spacing encoded using encoder sub-element 46; and (viii) gap roll increment encoded using sub-element 47.

The operator also has the initial responsibility of encoding other data which, for the most part, does not change during the survey. In this regard, the operator may have to only initially encode shot depth and size (at sub-elements 48 and 49), shot direction and offset (at sub-elements 50 and 51) as well as data related to the spread, as to its direction (at sub-element 52) and the distance between groups (at sub-element 53).

Switch arrays generally indicated at 54 and 55 are also set by the operator. Data provided by these switch arrays, relate to two or three possible switch states of the switches 56–66 which are, for example, related to the type of survey and run conditions occurring after the survey is underway.

[In this regard, the functions of the switches are as follows: Switch 56 specifies line direction; switch 57 specifies truck rank, i.e. determines if the reference truck is the master (or slave) in relationship with an alternate truck; switch 58 specifies operations in either a serial or in a parallel mode, the mode being related to whether one or two arrays of geophones are used in-line or parallel to the corresponding source line; pushbutton switches 59 and 60 relate to start up and to alarm reset functions respectively; switch 59, of course, initializes operations after all synchronization has been completed; switch 60 turns off the audio alarm in the event that a signal of some importance has been generated causing the alarm to also activate; transmit switch 61 "triggers" the energy source, and is operative only after the operator is assured the correctness of the array and source positions as displayed at displays 27; switches 62 and 63 related to (i) the "trigger" link associated with the activation of the source (electrical wire-line or radio) and (ii) whether or not the roll switch 22 (FIG. 2) is to be in an active or passive state. Three-position switch 64 establishes whether or not the operation is to be in a manual, automatic or test mode; update switch 65 operates only when the switch 64 is in the manual mode and is used (in manual mode) to initiate advances of the roll switch so as to generate new ground locations for the array after the recording cycle has been completed; and switch 66 is a conventional power-on switch.]

Displays 27 may be conventional LED segmented displays except that they are microcomputer implemented. Primary purposes of the displays 27: to provide data to the operator so that determinations as to whether or not the system is functioning correctly can be made, and to allow the operator to act as an independent cross-checker of the correctness of the displayed ground locations. The data at displays 27 relate for the most part to the type of run being undertaken and survey conditions.

[In this regard, the nature of the displays 27 is as follows: subdisplays 70 and 71 indicate shot location and number of shots per location, respectively; subdisplays 72–75 relate to geographic locations of the active array as a function of time; subdisplay 76 specifies the position of the slave reference; status subdisplay 77 specifies (by code) the occurrence of certain activities during the exploration operation which may be accompanied by an audio alarm to indicate the immediate need for operator intervention, and the meaning of the status code at subdisplay 77 being as set forth below, in Table I.

TABLE I

| Code | Activity |
| --- | --- |
| 0 | Setup for sequence start operation |
| 1 | Geometrical mistie |
| 2 | Ready for update or update in progress (if in auto mode) |
| 3 | Roll Switch Moving |
| 4 | Roll Switch (Stopped in position) |
| 5 | Roll Switch Disabled |

TABLE I-continued

| Code | Activity |
| --- | --- |
| 6 | Slave Reference Code Received |
| 7 | Transmission Reference Error (slave reference code not received) |
| 8 | Load Ref Output At Shift Register |
| 9 | Transmit (one bit of ref code) |
| A | Gap Set Mistie |
| D | Occurrence of Last Shot |
| 1X | Beeper On With Status Displayed as to Code 0, 1, . . . 9, A, D, alone. |
| 53 | Step Roll Switch Up With Beep on and Code "3" |
| 93 | Step Roll Switch Down With Beep on and Code "3". |

Explanation of Table I: status code "0" occurs any time that the controller 20 is powered up to cue the operator that all input data at the encoders 26 must then be set. Sequencing start button 59 terminates the cueing operation: status code "D" indicates that the last shot position is at hand and thus, the truck location and connection station vis-a-vis the array must be changed; status codes "3", "4", "5" and "53" and "93" indicate certain roll switch activities. If there are errors in the programmed exploration activity, warning codes are also generated by the status codes "1"; and "7".]

OPERATIONAL SEQUENCE

Assume the operator has initially calibrated the start-up positions of the array and source with the surveyed locations. As previously indicated in regard to FIG. 4, this entails encoding of positional data via encoders 26 in conjunction with proper setting of the switching arrays 54, 55. The result: corresponding shot, spread and associated data appear at the displays 27 due to the interaction of data relationship established through operation of the microcomputer 25 of FIG. 2. In order to better understand how the present invention uses all data, perhaps a brief overview of the hardware aspects of the microprocessor 30 is in order and is presented below in connection with FIG. 5.

Figure 5:
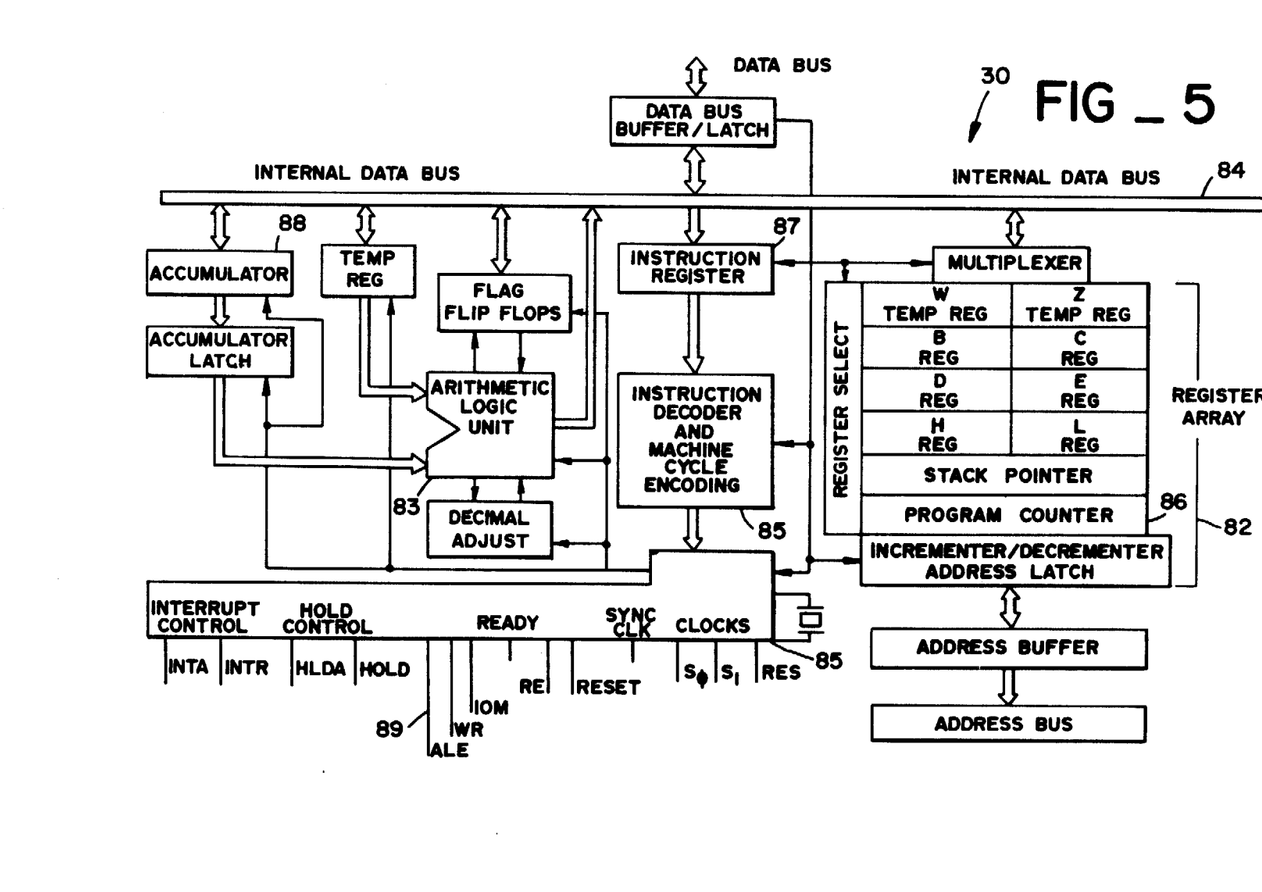

It should be initially noted that MPU 30 is preferably an Intel 8085 microprocessor, a product of Intel Incorp., Cupertino, California. As is well known, it has a microprocessor and controller integrated into a single chip. It also includes an array of registers 82 tied to an ALU 83 via an internal data bus 84 controlled via control unit 85. Program counter 86 and instructional register 87 have dedicated uses; the other registers, such as accumulator 88, have more general uses. In the 8085, expanded control functions result because the low-eight (8) address bits have the capability of being multiplexed. Such operation occurs at the beginning of each instructional cycle; the low-eight address lines appear via ALE line 89 for control of different elements of the location, including encoders 26, displays 27, and printer 35 through I/O interface array 34 of FIG. 6.

Figure 6:
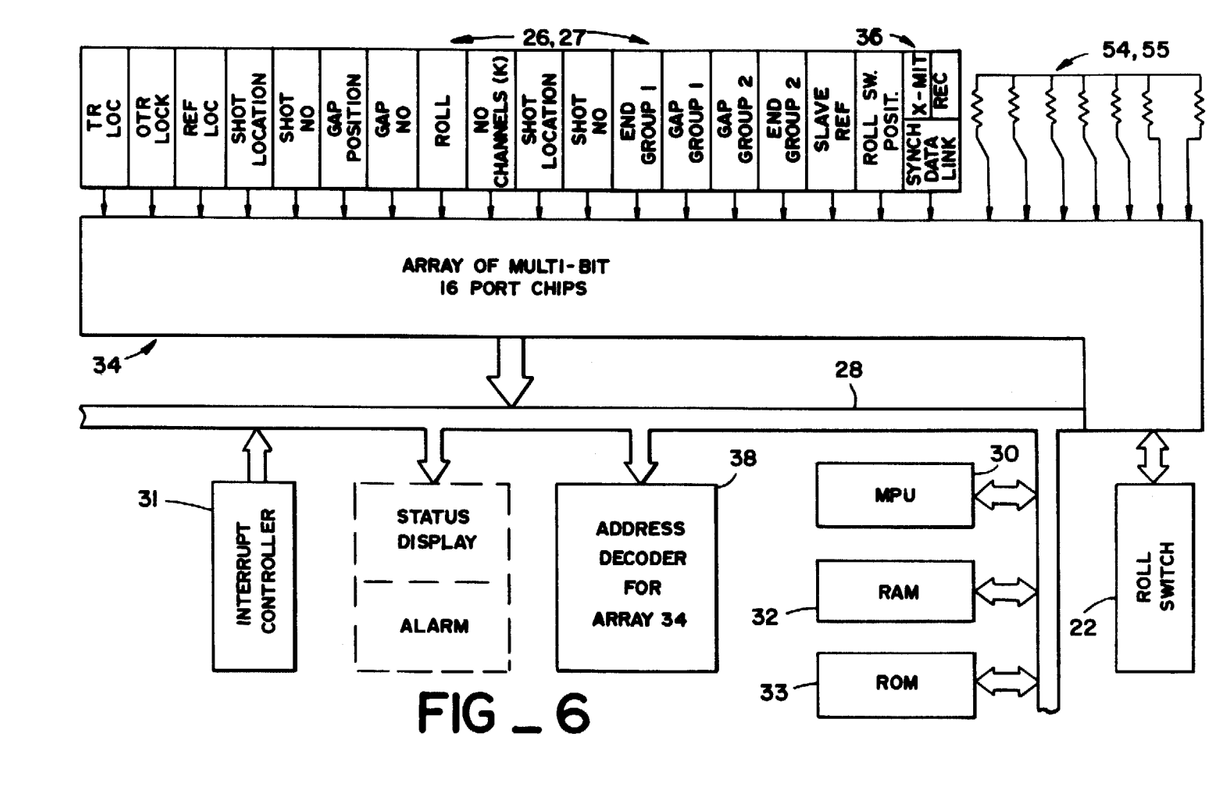

As shown in FIG. 6, while the I/O array 34 is conventional, it must be capable of handling a series of 8-bit independently addressable codes. For this purpose, it preferably comprises a multiplicity of 8-bit I/O port chips independently addressable via ALE line 89 of FIG. 5 of the MPU 30. Each 8-bit I/O port chip preferably comprises an 8-bit latch combined with a 3-state output buffer in which each can be separately driven. In determining location of data via address decoder 38, the MPU 30 also must manipulate the data using known geometrical relationships in which encoded positional data can be translated as required, depending on several factors.

UPDATE AND ALERT SEQUENCE

The foregoing operations assume that the operator has encoded all pertinent data via the encoders 26; that switch arrays 54, 55 have been properly set; and that the next-in-time array positions of the generated next-in-time data are approved locations.

Figure 7A:
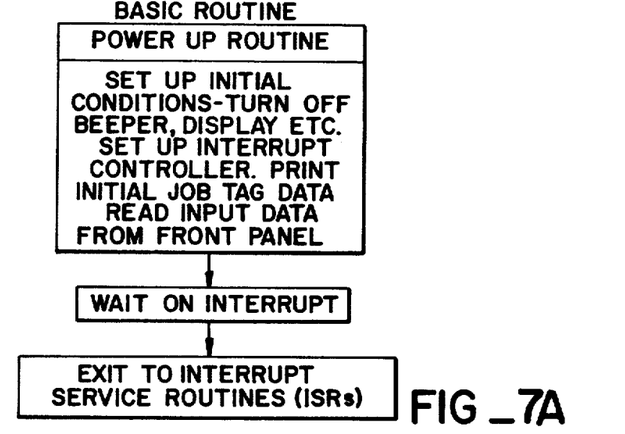
FIGS. 7A-7D and 8 are flow diagrams which illustrate the method of the present invention.
Figure 7B:
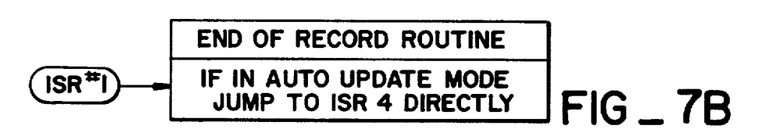
Figure 7C:
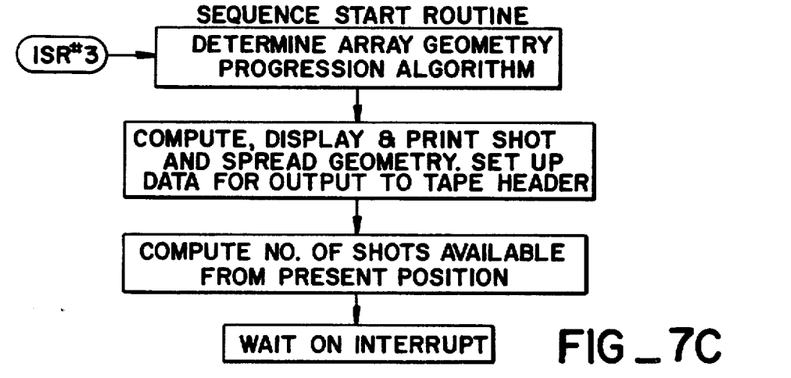
Figure 7D:
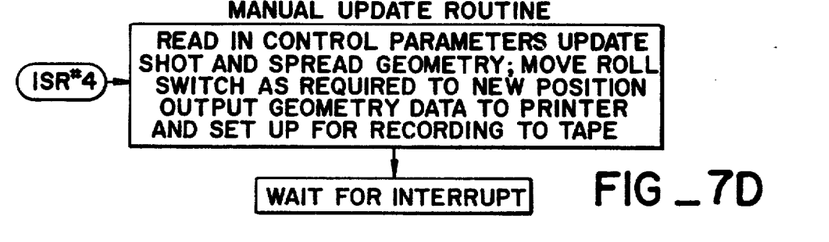

Initially the control and reference location position data from encoders 26 (and the switch arrays) are fetched by the MPU 30. The MPU 30 next performs the required manipulation of that data to provide spatial array and source geometries of interest in the manner of FIGS. 7A-7D, as well as to provide for the generation of an alarm-indicating code in the fashion of FIG. 8. While manipulation of data without and within the MPU 30 including (i) the execution of the power-up routine of FIG. 7A;
  (ii) the triggering of the system update routine via FIG. 7B;
  (iii) the execution of the sequence start routine of FIG. 7C;
  (iv) the triggering of the alternate manual update routine of 7D, are all of some importance, the generation of the alarm-indication code of FIG. 8 can take on a somewhat greater significance in moment-to-moment field operations. Hence, a brief description of the generation of such code is in order and is presented below with specific reference to FIG. 8.

Figure 8:
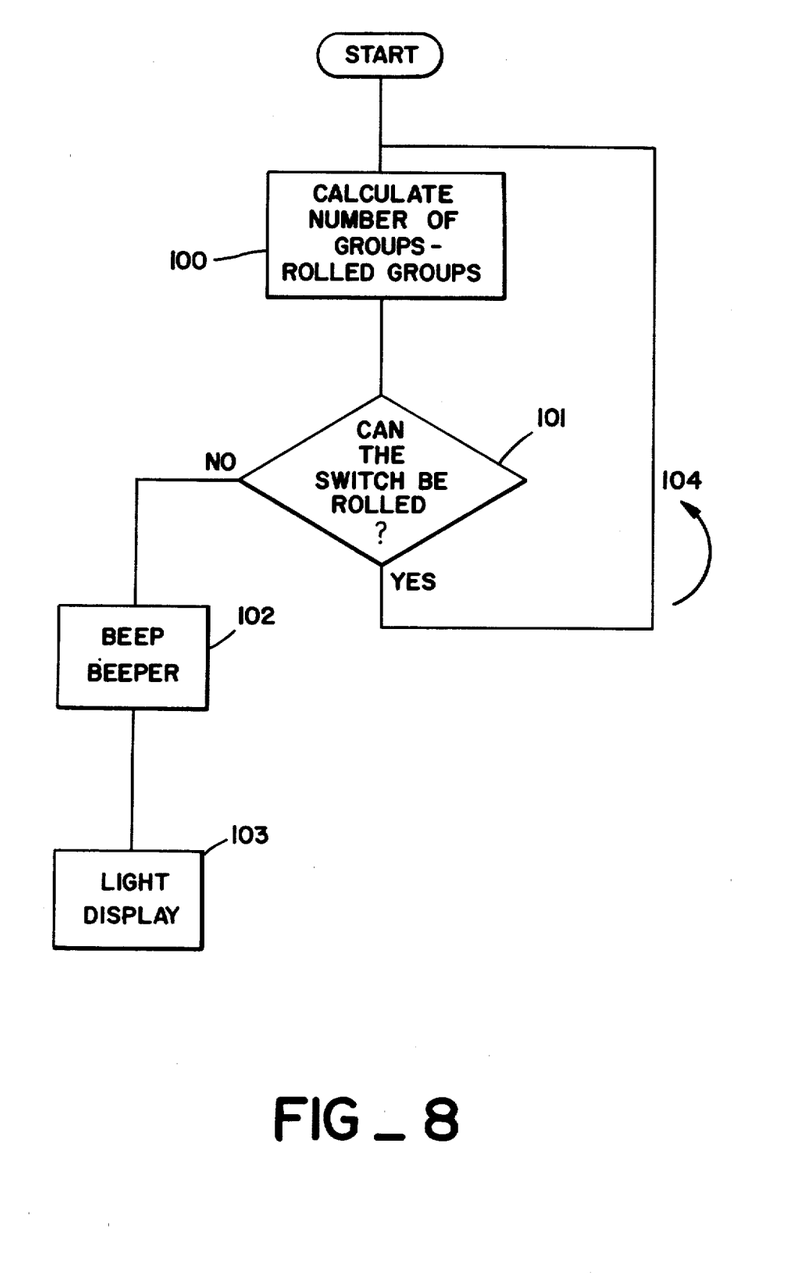

As shown in FIG. 8 note that at each occurrence of the generation of next-in-time array parameters in the manner of FIGS. 7A-7D, additional inquires along the lines of steps 100, 101, 102 and 103 of FIG. 8 are being performed. Result: the operator is provided with the knowledge as to when the next-in-time array positions are not approved array locations.

Now, in more detail, as shown in step 100, the MPU 30 determines first the difference between (i) the maximum number of detector/source groups available per fixed truck location (or roll switch matrix size) and (ii) the number of groups that will be "exhausted" after the generation of the next-in-time array parameters by the system.

Next at step 101 the result of step 100 is analyzed to determine if the next-in-time array positions are approved locations, say by determining if the result of step 101 is (or is not) greater than zero. If the result is greater than zero, i.e., the answer to the question posed by decisional step 101 is affirmative, the process then undergoes iteration via loop 104; on the other hand, if the result of step 101 is zero, then the next-in-time roll switch position is the last one available for seismic collection purposes as indicated by the generation of an alarm-indicating code for triggering an audio alarm (at step 102) and for causing activation of a visual alarm at step 103. This alerts the operator to the fact that, after collection of data, the subsequent next-in-time positions of the array along the line of survey will require a change in (i) the truck position and
  (ii) the start roll switch matrix position vis-a-vis the resulting positions of the series of detectors along the line of survey. A portion of the displays 27 of FIG. 4, of course, can be utilized for alerting the operator to the above situation.

Values of array parameters appearing at displays 27 of FIG. 4, including the selective alarm-generating code of FIG. 8, are, of course, dependent upon use of certain geometrical equation sets, viz. equation sets I, II, III and IV set forth below, stored in the MPU 30 and selectively utilized by the controller 20 as required.

SEQUENCE START EQUATION SET I

Assume both the ground location numbers and data channel numbers increasing along the seismic line in the direction of arrow 18; accordingly, the following set of equations control operations:

(1) RLSP = REF − NP − TR
(2) END 1 = REF
(3) END 2 = REF + GPNO + K − 1, If GPNO = 0
(4) GAP 1 = 0
(5) GAP 2 = 0, If GPNO > 0
(4) GAP 1 = REF + GPLOC − 1
(5) GAP 2 (N) = GAP 2 (N − 1) + Roll
(6) ROOM = TR − REF − GPNO + 1

Table II, below, defines the notations used above in connection with the Equation Set I.

TABLE II

| Notation | DEFINITION |
|---|---|
| SHLO | Energy source location |
| SHNO | Energy source number |
| REF | Location of reference sensor |
| ROOM | No. of rollalong switch positions available for advancing the active spread |
| TR | Ground reference for recorder location |
| PNO | Number of geophone groups in the GAP |
| GPLOC | Location of the GAP |
| K | Number of data channels in recording system (24, 48, 60, 96, 120, etc). |
| END 1 | Ground location of the geophone group interconnected through the rollalong switch to the first data channel of the recorder. |
| END 2 | Ground location of the Kth data channel |
| GAP 1 | Ground location of the data channel below the GAP on the first data channel side. |
| GAP 2 | Ground location of the data channel above the GAP toward the Kth channel. |
| RLSP | Rollalong switch position required for a desired active spread location. |
| NP | Number of rollalong switch positions available minus 1. (N − 1). Rollalong switch must be configured for K + N inputs and K outputs. |
| GL(+) | Ground location numbers along the seismic line increasing numerically in the direction in which the active geophone array is advanced for each successive record sequence |
| GL(−) | Ground locations numbers decreasing numerically in the direction in which the active spread is advanced. |
| CH(+) | Seismic data channel increasing (1 to K) numerically along the active spread in the direction in which the active spread is advanced. |
| CH(−) | Seismic data channels numerically decreasing (from K to 1) in the direction in which the active spread is advanced. |

Note that the signs (+) (−) of each of the ground location numbers (GL) signifies its relationship with respect to the direction of the array advance; the reference sensor and the sign of the channel number are also dependent on the array reference status. If the latter is 1, the CH is positive. If not, then the sign is negative.

SEQUENCE START EQUATION SET II

With the ground location numbers increasing but the channel numbers decreasing, the following set of equations is used:

(1) RLSP = TR − REF − GPNO + 1
(2) END 1 = REF + GPNO + K − 1
(3) END 2 = REF, If GPNO = 0
(4) GAP 1 = 0
(5) GAP 2 = 0, If GPNO > 0
(4) GAP 1 = END 1 − GPLOC − 1
(5) GAP 2 = END 1 − GPLOC − GPNO
(6) ROOM = TR − REF − GPNO.

SEQUENCE START EQUATION SET III

With ground location numbers decreasing but the channel numbers increasing, the following set of equations is used:

(1) RLSP = TR + NP − REF
(2) END 1 = REF
(3) END 2 = REF − (K − 1) − GPNO, If GPNO = 0
(4) GAP 1 = 0
(5) GAP 2 = 0, If PPNO > 0
(4) GAP 1 = REF − GPOC − 1
(5) GAP 2 = REF − GPLOC − GPNO
(6) ROOM = REF − TR − GPNO + 1

SEQUENCE START EQUATION SET IV

With both ground location numbers and channel numbers decreasing, the following set of equations is used:

(1) RLSP = REF − TR − GPNO + 1
(2) END 1 = REF − (K − 1) − GPNO
(3) END 2 = REF, If GPNO = 0
(4) GAP 1 = 0
(5) GAP 2 = 0, If GPNO > 0
(4) GAP 1 = END 1 + GPLOC − 1
(5) GAP 2 = END 1 + GPLOC + GPNO
(6) ROOM = REF − TR − GPNO

Following these operations, the operator peruses the data at displays 27 and the encoders 26. If it is correct, he activates the trigger switch 61 (FIG. 4) to ultimately cause the energy source 16 (FIG. 1) to be activated. But before that can occur, there is transference of all pertinent header data to the digital field recorder 21.

It should be understood that the invention is not directed to specific embodiments set forth above, but that many variations are readily apparent to those skilled in the art, so thus the invention is to be given the broadest possible interpretation within the terms of the following claims.

What is claimed is:

1. Method of selectively providing an alarm-generating digital code so as to alert an operator that a next-in-time array positions of a source-detector array associated with a recording truck are the last approved array locations, using a microcomputer system that includes an MPU, memory means and a series of display, switching and alarm means interconnected via a system bus, comprising:

(a) storing as data bits, information as to the maximum number of detectors or detector groups accommodated by a fixed roll switch matrix size associated with said array;

(b) at the end of each seismic data collection cycle, determining a difference value between (a) and the total number of detectors or detector groups that will have been employed at the end of the next-in-time collection cycle, and using said difference value to conditionally generate said alarm-generating digital code so as to alert said operator when the next-in-time positions are the last approved array locations for said source-detector array.

2. Method of claim 1 in which step (b) is further characterized by the substeps of
 (i) if said difference value is greater than zero, no alarm-generating code is provided but
 (ii) if said difference is zero, said alarm-generating code is activated.

3. Method of claim 2 in which said code is used to trigger both audio and visual alarms, to alert said operator.

4. A ground position controller for selectively providing an alarm-generating digital code so as to alert an operator that next-in-time array positions of a source-detector array associated with a recording truck are the last approved array locations, including a microcomputer system comprising an MPU, memory units and display, switching and alarm means interconnected via a system bus, said MPU including means for separately determining the difference between (i) the maximum number of detectors or detector groups accommodated by a fixed roll switch matrix size during collection of seismic data and (ii) the total of detectors or detector groups that will have been employed at the end of the next-in-time collection cycle, and for conditionally emitting an alarm-generating code for warning purposes, so as to alert the operator when the next-in-time array positions are the last-approved array locations for said source-detector array.

5. Controller of claim 4 in which said display switching and alarm means devices include a separate display means for visual alerting purposes.

6. Method of claim 1 in which said alarm-generating digital code is used to trigger at least an audio alarm so as to alert the operator that the next-in-time array positions of the source-detector array are the last approved array locations.

7. Method of claim 1 in which said alarm-generating digital code is used to trigger at least a visual alarm to alert the operator that the next-in-time array positions of the source-detector array are the last approved array locations.

8. Controller of claim 4 in which said display, switching and alarm means include a separate audio signaling means for audio alerting purposes connected to said first-mentioned means of said MPU.

* * * * *